US008186955B2

(12) United States Patent
Buskirk et al.

(10) Patent No.: US 8,186,955 B2
(45) Date of Patent: May 29, 2012

(54) ROTATING MACHINE BALANCING MEMBER ASSEMBLY INCLUDING MULTIPLE INTERLOCKING BALANCING MEMBERS

(75) Inventors: Eric Steven Buskirk, Guilderland, NY (US); William Earl Fish, Amsterdam, NY (US); Karsten Johannes Tessarzik, Altamont, NY (US)

(73) Assignee: General Electric Company, Schenectady, NY (US)

( * ) Notice: Subject to any disclaimer, the term of this patent is extended or adjusted under 35 U.S.C. 154(b) by 977 days.

(21) Appl. No.: 11/937,032

(22) Filed: Nov. 8, 2007

(65) Prior Publication Data

US 2009/0123282 A1 May 14, 2009

(51) Int. Cl.
*F01D 25/04* (2006.01)

(52) U.S. Cl. ........................................... 416/145

(58) Field of Classification Search .................. 416/144, 416/145
See application file for complete search history.

(56) References Cited

U.S. PATENT DOCUMENTS

| 1,497,735 | A |   | 6/1924  | Richardson |
|-----------|---|---|---------|------------|
| 2,895,766 | A |   | 7/1959  | Leopold, Jr. |
| 3,631,872 | A |   | 1/1972  | Ivey et al. |
| 4,064,762 | A | * | 12/1977 | Wikner .......................... 73/487 |
| 4,721,445 | A | * | 1/1988  | Hoffmann .................... 418/61.3 |
| 4,842,485 | A |   | 6/1989  | Barber |
| 5,074,723 | A |   | 12/1991 | Massa et al. |
| 5,263,995 | A |   | 11/1993 | Mogilnicki et al. |
| 5,545,010 | A | * | 8/1996  | Cederwall et al. ............. 416/145 |
| 6,139,762 | A | * | 10/2000 | Esposito et al. ................. 216/39 |
| 6,279,240 | B1 |  | 8/2001  | Bonaventura, Jr. |
| 6,279,420 | B1 |  | 8/2001  | Knorowski et al. |
| 6,322,299 | B1 |  | 11/2001 | Hartman |
| 6,471,453 | B1 |  | 10/2002 | Winebrenner et al. |
| 6,477,916 | B2 |  | 11/2002 | Knorowski et al. |
| 7,393,164 | B2 |  | 7/2008  | Chen |
| 2002/0020315 | A1 | | 2/2002 | Siebolds et al. |
| 2009/0123282 | A1 | | 5/2009 | Buskirk et al. |

FOREIGN PATENT DOCUMENTS

| FR | 2461855 A3 | 2/1981 |
| FR | 2630496 A1 | 10/1989 |
| GB | 2454568 A | 5/2009 |
| GB | 2454569 A | 5/2009 |
| JP | 2003-278838 A | 10/2003 |
| JP | 2009-115317 A | 5/2009 |

OTHER PUBLICATIONS

Great Britian Search Report for corresponding GE Application No. GB0819582.8, dated Feb. 20, 2009, pp. 1-3.

* cited by examiner

*Primary Examiner* — Dwayne J White
(74) *Attorney, Agent, or Firm* — Cantor Colburn LLP

(57) ABSTRACT

A rotating machine includes a stationary member and a rotating member moveable relative to the stationary member. The rotating member includes at least one balancing member assembly receiving portion having a plurality of internal threads. The rotating machine also includes a balancing member assembly including first and second interlocking balancing members. The balancing member assembly also includes a plurality of external threads that are operatively connected to the internal threads of the balancing member assembly receiving portion. With this arrangement, the balancing member assembly provides a dynamic balance for the rotating member.

17 Claims, 6 Drawing Sheets

ROTATING MACHINE BALANCING MEMBER ASSEMBLY INCLUDING MULTIPLE INTERLOCKING BALANCING MEMBERS

BACKGROUND OF THE INVENTION

The present invention relates to the art of rotary machines and, more particularly, to a balancing member assembly for a rotating component in a rotary machine.

In the manufacture of rotating machines, such as turbomachinery, final balancing of rotating components is an essential and important step. In addition to final balancing after manufacture, periodic re-balancing of the rotating component is necessary in order to ensure proper operation and long operational life. Balancing is typically achieved by adding or removing weights to the rotating component, e.g., rotor, to compensate for deviations in rotor straightness and components mounted to the rotor, such as buckets and covers, or to lower vibration levels at which the turbomachine is operating.

The weights are typically mounted in weight grooves or openings formed in the rotor body. Weight grooves intended for use during manufacture of the turbomachine typically have a T-shaped or dovetail cross-section. Other balance weights include threaded plugs located along the rotor body. Balance weights are typically one to live times longer than an air gap, i.e., the gap that exists between the rotor body and a stator, or an entrance gap, i.e., the gap that provides access to the air gap of a rotating machine. Thus, changing weights with the rotor installed in the turbomachine is not possible. Therefore, the rotor must be removed, transported to a balance facility, balanced and returned to service. This process can take as much as 2-3 weeks, adding considerably to machine down lime. A power plant, for example, can loose significant revenue each day the turbomachine is out of service.

BRIEF DESCRIPTION OF THE INVENTION

In accordance with a first aspect of the present invention, a rotating machine includes a stationary member and a rotating member moveable relative to the stationary member. The rotating member includes at least one balancing member assembly receiving portion having a plurality of internal threads. The rotating machine also includes a balancing member assembly having first and second interlocking balancing members. Each of the first and second balancing members includes a plurality of external threads that are operatively connected to the internal threads of the at least one balancing member assembly receiving portion. With this arrangement, the balancing member assembly provides a dynamic balance for the rotating member.

In accordance with another aspect of the present invention, a method of balancing a rotating member of a rotating machine includes exposing a balancing member assembly receiving position provided on the rotating member, inserting a first balancing member into the balancing member assembly receiving portion to a first depth, and interlocking a second balancing member to the first balancing member. The method further includes inserting the second balancing member into the balancing member receiving portion to a second depth while simultaneously driving the first balancing member into the balancing member assembly receiving portion to a third depth.

At this point it should be appreciated that exemplary embodiments of the present invention provide a balancing member assembly that can be inserted into a balancing member assembly receiving portion without requiring disassembly of the rotating machine. That is, the in multiple interlocking components are individually mounted to the rotor without requiring turbomachine disassembly. In this manner, the present invention shortens rotating machine down lime thereby increasing operating efficiency and reducing operational and maintenance costs.

In any event, additional objects, features and advantages of the various aspects of an exemplary embodiment of the present invention will become more readily apparent from the following detailed description when taken in conjunction with the drawings wherein like reference numerals refer to corresponding parts in the several views.

DETAILED DESCRIPTION OF THE INVENTION

Figure 1:
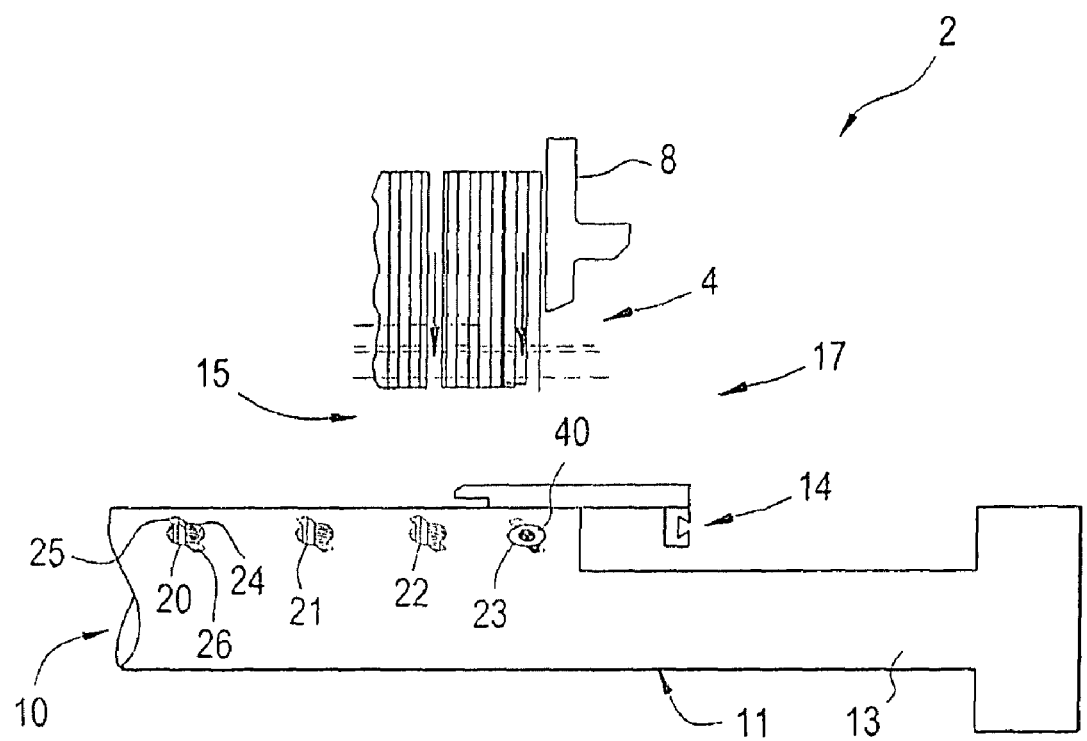
FIG. 1 is a schematic view of a portion of a rotating machine, illustrated as a turbomachine, including a balancing member assembly constructed in accordance with an exemplary embodiment of the present invention.
Figure 2:
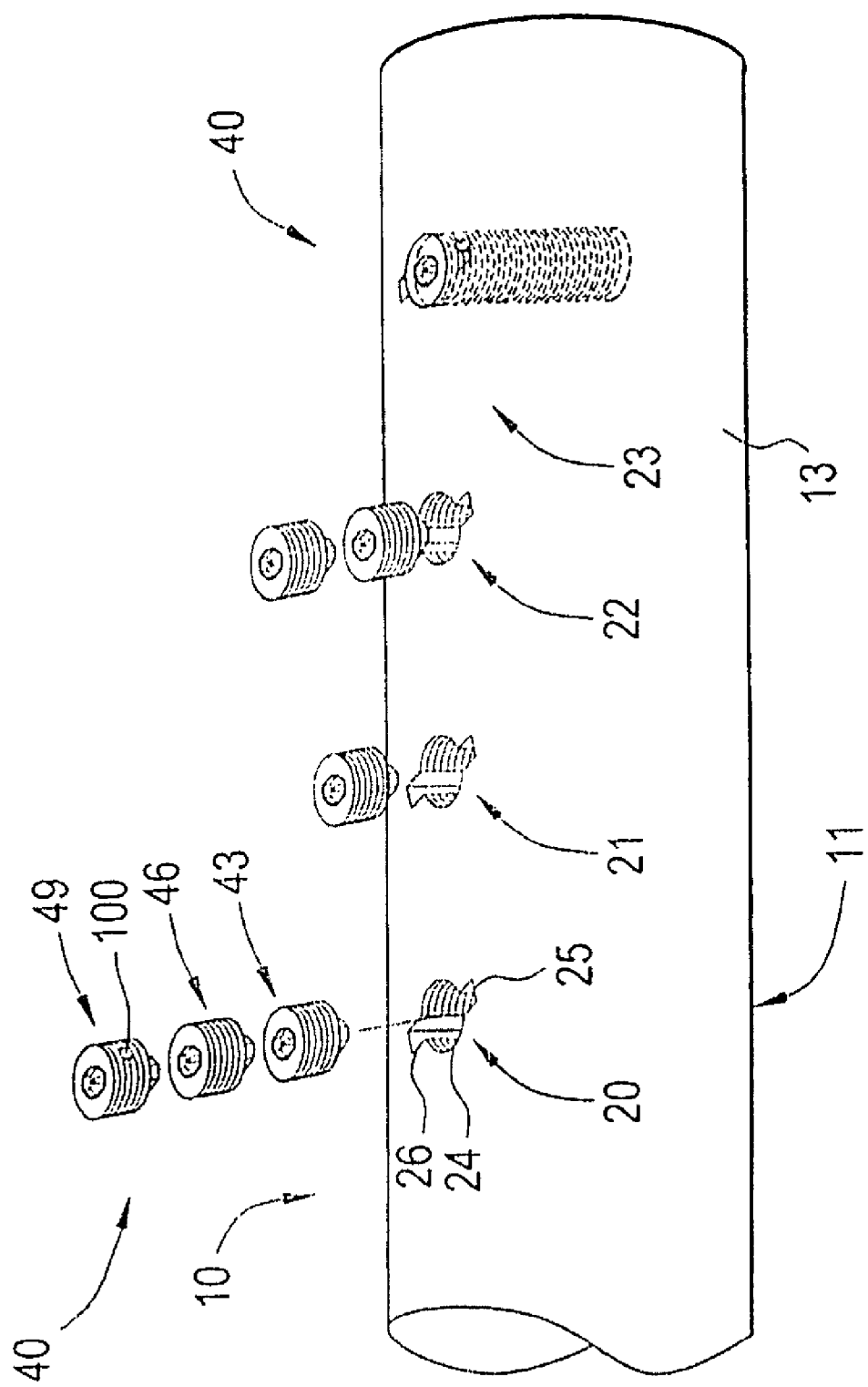
FIG. 2 is a partial perspective exploded view of balancing member assemblies prior to, and after, installation in a rotating component of the turbomachine.

With initial Reference to FIGS. 1-2, a rotating machine, illustrated as a turbomachine, constructed in accordance with an exemplary embodiment of the present invention is indicated generally at 2. Turbomachine 2 includes a stationary member or stator 4 having a plurality of stacked laminations indicated generally at 6, that are held in place by a flange 8. Turbomachine 2 further includes a rotating member or rotor 10 including a main body 11 having an outer surface 13 that is spaced from stator 4 by an air gap 15. Access to air gap 15 is obtained through an entrance gap 17 located adjacent flange 8. Rotor 10 is shown to include a plurality of balancing member receiving portions 20-23 each of which includes a retention configuration in the form of a plurality of internal threads 24 such as shown in connection with balancing member receiving portion 20. Of course various other retention configurations employed to achieve a fixed and or selectively adjustable connection between two parts could also be employed. Although not shown, it should be understood that additional balancing member receiving openings are provided at radially and axially spaced locations along rotor 10. As will be discussed more fully below, a weight or balancing member assembly 40 is mounted in one or more of the plurality of balancing member receiving portions 20-23 to provide a dynamic balance for rotor 10. The size, number, location and material composition of each component of balancing member assembly depends upon a particular balance requirement for rotor 10.

As shown in FIG. 2, balancing member assembly 40 includes a plurality of interlocking components. More specifically, balancing member assembly 40 includes a first interlocking balancing member 43, a second interlocking balancing member 46, and a third interlocking balancing member 49. As will be discussed more fully below each of the interlocking balancing members is sized so as to be readily introduced into air gap 15 and entrance gap 17 such that rotor 10 can be balanced without requiring removal from turbomachine 2. That is, balancing members 43, 46, and 49 range in size between approximately 1-inch (2.54 cm) and 5-inches (12.7-cm). Of course, the particular size of the balancing members is dependent upon the material composition and the type and size of the machine requiring balancing.

Figure 3:
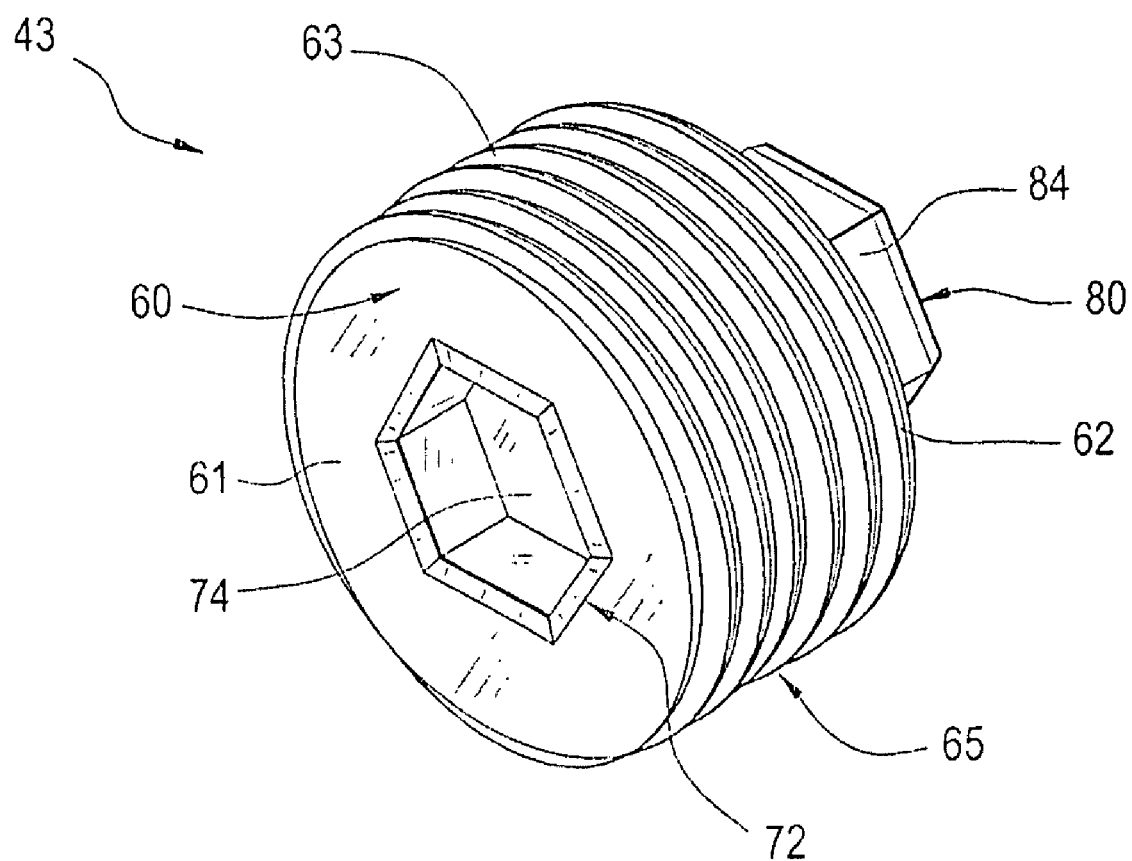
FIG. 3 is an upper right perspective view an interlocking balancing member of the balancing member assembly of the exemplary embodiment.
Figure 4:
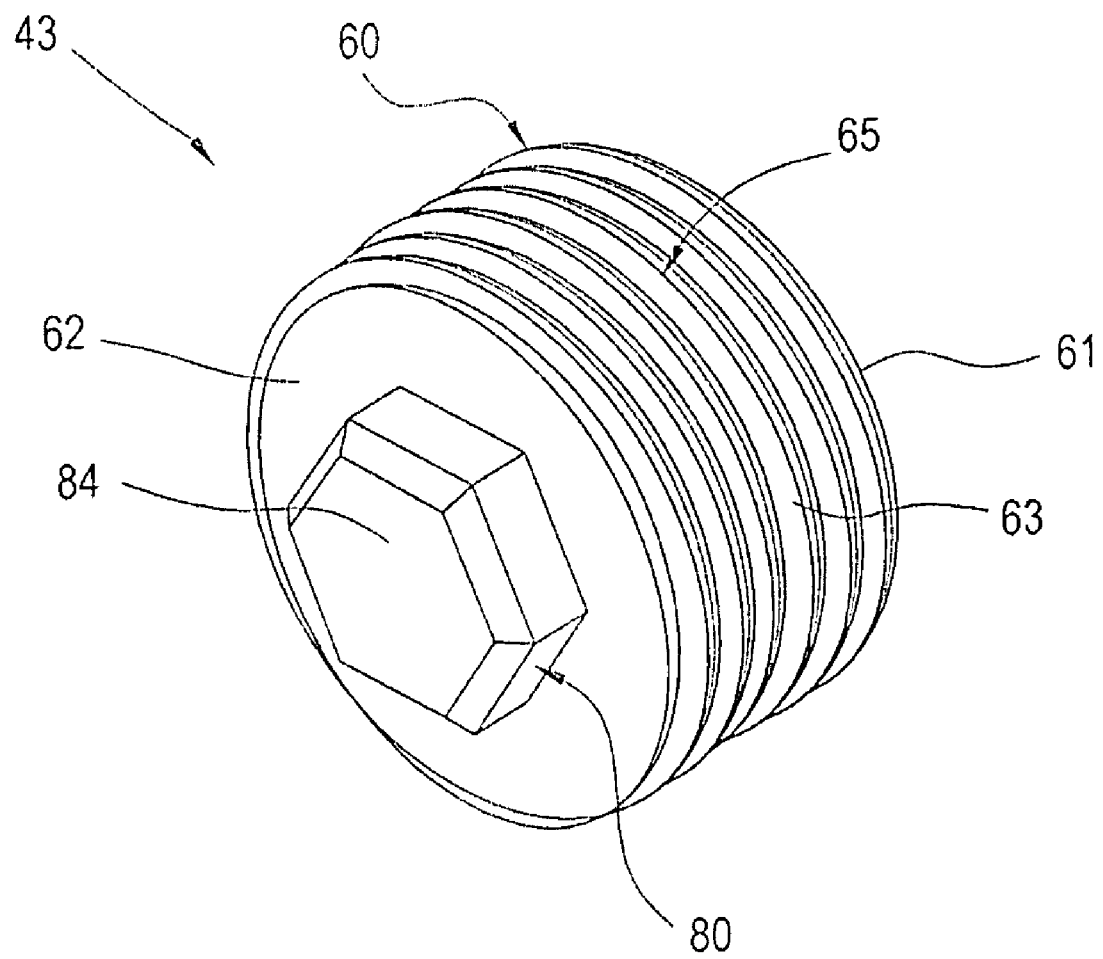
FIG. 4 is a lower left perspective view the interlocking balancing member of FIG. 3.

As each balancing member 43, 46, and 49 is substantially similar in form, a detailed description will follow with reference to FIGS. 3 and 4 in describing balancing member 43, with an understanding that balancing members 46 and 49 include analogous structure. As shown, balancing member 43 includes a main body portion 60 having a first end portion 61 and a second end portion 62 interconnected by an intermediate portion 63. Intermediate portion 63 includes a retention arrangement illustrated as a plurality of external threads indicated generally at 65 that extend between first end portion 61 and second end portion 62 substantially covering intermediate portion 63. Balancing member 43 includes a first connector member 72, shown in the form of a recessed region 74 formed in first end portion 61. Recessed region 74 is hexagonal in the shape and designed to receive a tool such as a hex key. Of course, various other shapes, such as slots and squares, as well as other drive arrangements could also be employed. Balancing member 43 is further shown to include a second connector member 80, shown in the form of a hexagonal projection 84 extending from second end portion 63. In a manner similar to that describe above, second connector member 80 could also take on various forms, however, while not required, in some embodiments, first and second connector members 72 and 84 correspond in size and shape.

In the exemplary embodiment shown, balancing member 43 is formed from, for example, at least one of stainless steel, tungsten, and beryllium copper and combinations including one or more of the foregoing. The particular material employed can vary and would depend on the amount of balance correction required by rotor 10. Towards that end, numerous other materials having various densities could also be employed. In any event, the overall weight of balancing member 43 is dictated by material composition, length, i.e., volume, and relative radial position. In this manner, balancing member assembly 40 can be tailored to particular requirements of a specific application. That is, balancing member assembly 40 is formed from multiple interlocking components, e.g., balancing members 43, 46, and 49 having the same or different properties depending upon an amount of balance correction or counter-balance required to offset an out-of-balance condition of a particular rotor 10 as will be discussed more fully below. Each balancing member 46 and 49 is shown to include corresponding first and second connector members 91, 92 and 94, 95 respectively.

Figure 5:
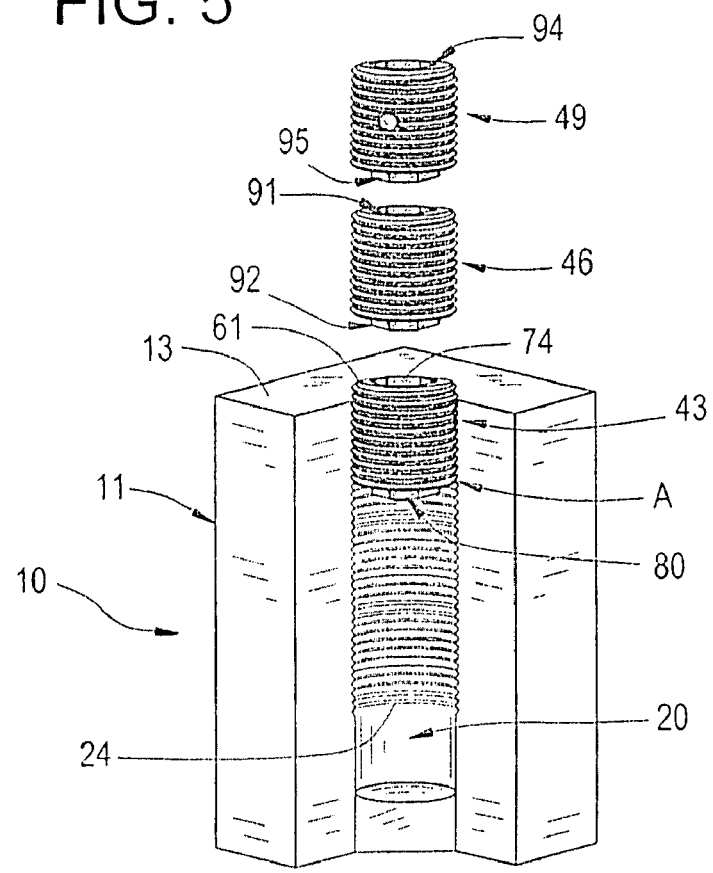
FIG. 5 is a partial cross-sectional exploded view of a rotating member receiving a first balancing member of a balancing member assembly of the exemplary embodiment.

Having described one embodiment of a construction of balancing member assembly 40, reference will now be made to FIG. 5-7 in describing an exemplary method of mounting balancing member assembly 40 in rotor 10. As shown, first balancing member 43 is inserted into, for example, balancing member receiving portion 20. Once in place, a tool (not shown) employing a hex key is inserted into first connector member 72. At this point, balancing member 43 is rotated or screwed into rotor 10 to a first depth indicated at "A", e.g., until first end portion 61 is adjacent outer surface 13.

Figure 6:
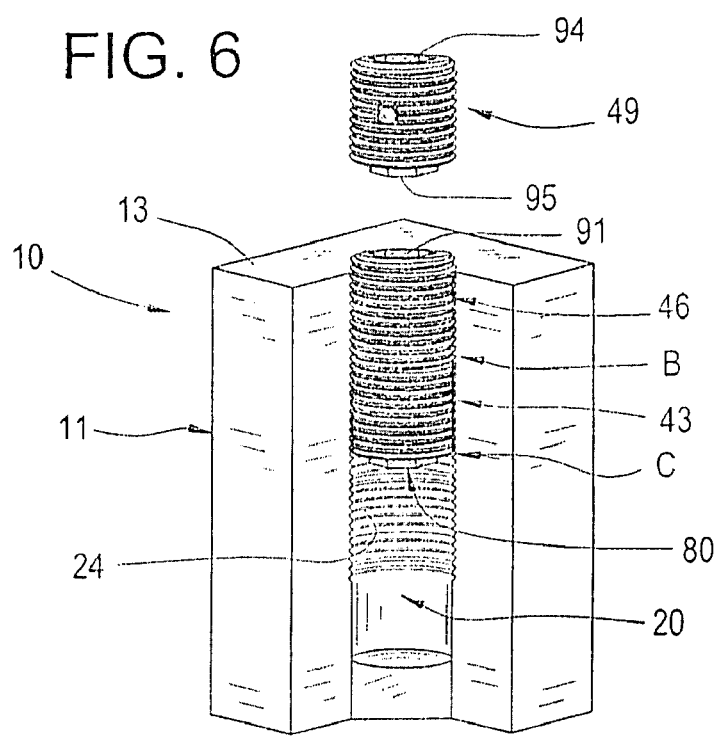
FIG. 6 is a partial cross-sectional exploded view of the rotating member of FIG. 5, shown receiving a second balancing member interlocked with the first balancing member.
Figure 7:
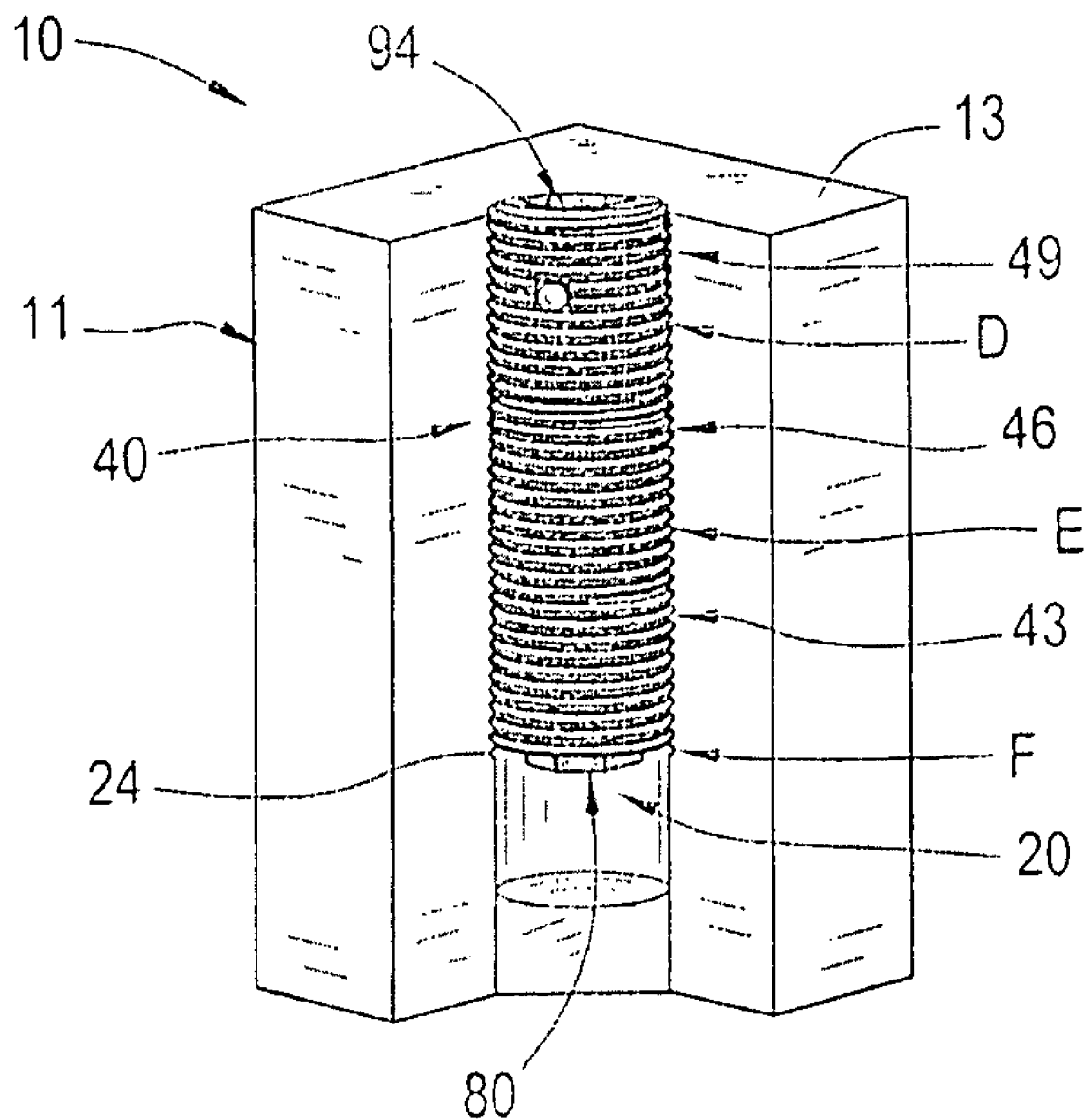
FIG. 7 is a partial cross-sectional exploded view of the rotating member of FIG. 6, shown receiving a third balancing member interlocked with the first and second balancing members.

Once balancing member 43 is in place, second connector member 92 of balancing member 46 is inserted into first connector member 74 to interlock first and second balancing members 43 and 46 such as shown in FIG. 6. At this point, the tool (not shown) is inserted into first connector member 91 on second balancing member 46. In a manner similar to that described above, second balancing member 46 is rotated or screwed into rotor 10 to a second depth, indicated generally at "B" while, simultaneously, driving first balancing member 43 to a third depth indicated generally at "C". As shown, second depth "B" can be the same as or near to first depth "A" depending on the overall length of balancing member 43.

Once balancing member 46 is in place, second connector member 95 of balancing member 49 is interlocked with first connector member 91 on second balancing member 46 to form balancing member assembly 40. At this point, the tool (not shown) is then inserted into first connector member 94 of balancing member 49 and operated to insert balancing member assembly 40 as a unit, into rotor 10. In the configuration shown, balancing member 49 is inserted to a fourth depth, indicated generally at "D" while simultaneously driving balancing member 46 to a fifth depth, "E" and balancing member 43 to a sixth depth "F". Of course the particular locations of depths E-F can vary depending upon the length of each balancing member 43, 46, and 49. In any event, once third balancing member 49 is seated, the tool is removed from first connector member 94 and balancing member assembly 40 is locked in place. Balancing member assembly 40 can be locked in place through various methods such as, for example, staking or peening balancing member 49 to outer surface 13 of rotor 10 or by a locking device, such as indicated generally at 100, that selectively engages rotor 10. Once in place, balancing member assembly 40 is prevented from becoming loose during the operation of turbomachine 2.

At this point, it should be appreciated that the exemplary embodiments described above provide a balancing member assembly that can be inserted into a balancing member assembly receiving portion without requiring disassembly of the turbomachine. That is, by forming the balancing assembly in multiple interlocking components, with each components being smaller than a rotor air gap and/or an entrance gap, the various components can be individually mounted to the rotor without requiring any significant rotary machine disassembly. In this manner, the present invention shortens rotary machine down time thereby increasing operating efficiency and reducing operational and maintenance costs.

In general, this written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the present invention if they have structural elements that do not differ from the literal language of the claims, or if they include equivalent structural elements with insubstantial differences from the literal language of the claims.

The invention claimed is:

1. A rotating machine comprising:
   a stationary member;
   a rotating member moveable relative to the stationary member, the rotating member including at least one balancing member assembly receiving portion, the at least one balancing member assembly receiving portion including a retention configuration; and a balancing member assembly including first and second interlocking balancing members, each of the first and second interlocking balancing members including a retention arrangement configured to engage with the retention configuration of the at least one balancing member assembly receiving portion to provide a dynamic balance for the rotating member.

2. The rotating machine according to claim 1, wherein the first interlocking balancing member includes a first end portion extending to a second end portion through an intermediate portion, the first end portion having a first connector member.

3. The rotating machine according to claim 2, wherein the first connector member is a recessed region formed in the first end portion.

4. The rotating machine according to claim 3, wherein the recessed region is hexagonal in shape.

5. The rotating machine according to claim 2, wherein the first interlocking balancing member includes a second connector member, the second connector member being provided at the second end portion.

6. The rotating machine according to claim 5, wherein the second connector member is a projection extending from the second end portion.

7. The rotating machine according to claim 6, wherein the projection is hexagonal in shape.

8. The rotating machine according to claim 2, wherein the second interlocking balancing member includes a first end portion that extends to a second end portion through an intermediate portion, the second end portion including a second connector portion, the second connector portion being adapted to interconnect with the first connector portion to form the balancing member assembly.

9. The rotating machine according to claim 8, wherein the second connector portion is a projection.

10. The rotating machine according to claim 8, wherein the second interlocking balancing member includes a third connector member provided on the first end portion, the third connector member being a recessed region.

11. The rotating machine according to claim 1, further comprising: a third interlocking balancing member joined with the first and second interlocking balancing members.

12. The rotating machine according to claim 1, wherein the rotating machine is a turbomachine.

13. The rotating machine according to claim 1, further comprising: an air gap having a first width extending between the stationary member and the rotating member, each of the first and second interlocking balancing members having a length smaller than the first width.

14. The rotating machine according to claim 1, wherein the retention configuration of the at least one balancing member assembly receiving portion is a plurality of internal threads and the retention arrangement of the balancing member assembly is a cooperating plurality of external threads.

15. A method of balancing a rotating member of a rotating machine comprising:

accessing a balancing member assembly receiving opening provided on the rotating member;

inserting a first balancing member to a first depth into the balancing member assembly receiving opening;

interlocking a second balancing member to the first balancing member to form a balancing member assembly; and inserting the balancing member assembly into the rotor with the second balancing member being inserted to a second depth while simultaneously driving the first balancing member to a third depth.

16. The method of claim 15, wherein interlocking the second balancing member to the first balancing member includes engaging a projection on the second balancing member with a recessed region formed in the first balancing member.

17. The method of claim 16, further comprising:

interlocking a third balancing member to the second balancing member; and inserting the third balancing member to a fourth depth while simultaneously driving the second balancing member to a fifth depth and the first balancing member to a sixth depth.

* * * * *